United States Patent
Imamura

(10) Patent No.: US 10,850,512 B2
(45) Date of Patent: Dec. 1, 2020

(54) INK JET RECORDING HEAD AND METHOD OF MANUFACTURING SAME

(71) Applicant: CANON KABUSHIKI KAISHA, Tokyo (JP)

(72) Inventor: Isao Imamura, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/276,851

(22) Filed: Feb. 15, 2019

(65) Prior Publication Data
US 2019/0263117 A1  Aug. 29, 2019

(30) Foreign Application Priority Data

Feb. 23, 2018  (JP) ................. 2018-030889
Dec. 28, 2018  (JP) ................. 2018-247640

(51) Int. Cl.
| | |
|---|---|
| *B41J 2/14* | (2006.01) |
| *C08L 63/00* | (2006.01) |
| *C08K 9/06* | (2006.01) |
| *C08K 3/22* | (2006.01) |

(52) U.S. Cl.
CPC .......... *B41J 2/14201* (2013.01); *C08K 3/22* (2013.01); *C08K 9/06* (2013.01); *C08L 63/00* (2013.01); *B41J 2002/14306* (2013.01); *B41J 2202/03* (2013.01); *C08K 2003/2227* (2013.01); *C08K 2201/003* (2013.01); *C08K 2201/014* (2013.01)

(58) Field of Classification Search
CPC .............. B41J 2/14201; B41J 2202/03; B41J 2002/14306; B41J 2/1408; B41J 2202/19; B41J 2202/20; C08K 3/22; C08K 9/06; C08K 2201/014; C08K 2201/003; C08K 2003/2227; C08L 63/00; C08G 59/621

See application file for complete search history.

(56) References Cited

U.S. PATENT DOCUMENTS

| | | | |
|---|---|---|---|
| 5,057,854 A | 10/1991 | Pond et al. | |
| 6,793,326 B2 | 9/2004 | Imamura et al. | |
| 7,034,404 B1* | 4/2006 | Harada | ............... C08G 59/62 |
| | | | 257/788 |
| 7,074,273 B2 | 7/2006 | Shimomura et al. | |
| 7,687,552 B2 | 3/2010 | Otaka et al. | |
| 7,709,554 B2 | 5/2010 | Otaka et al. | |
| 7,947,336 B2 | 5/2011 | Otaka et al. | |
| 8,210,650 B2 | 7/2012 | Ishizuka et al. | |
| 9,458,309 B2 | 10/2016 | Imamura et al. | |
| 2017/0157937 A1* | 6/2017 | Imamura | ............... B41J 2/175 |

FOREIGN PATENT DOCUMENTS

| | | |
|---|---|---|
| JP | 5-24192 A | 2/1993 |
| JP | 2009-155370 A | 7/2009 |
| JP | 2011-173970 A | 9/2011 |
| JP | 2015-206009 A | 11/2015 |

OTHER PUBLICATIONS

IP.com search (Year: 2019).*
IP.com search (Year: 2020).*

* cited by examiner

*Primary Examiner* — Lisa Solomon
(74) *Attorney, Agent, or Firm* — Venable LLP

(57) ABSTRACT

Provided is an ink jet recording head having a flow path member. The flow path member is made of a thermoset product of a thermosetting molding composition containing a solid epoxy resin composition containing an epoxy resin and a phenolic resin, each solid at ordinary temperatures, and an alumina filler.

18 Claims, 3 Drawing Sheets

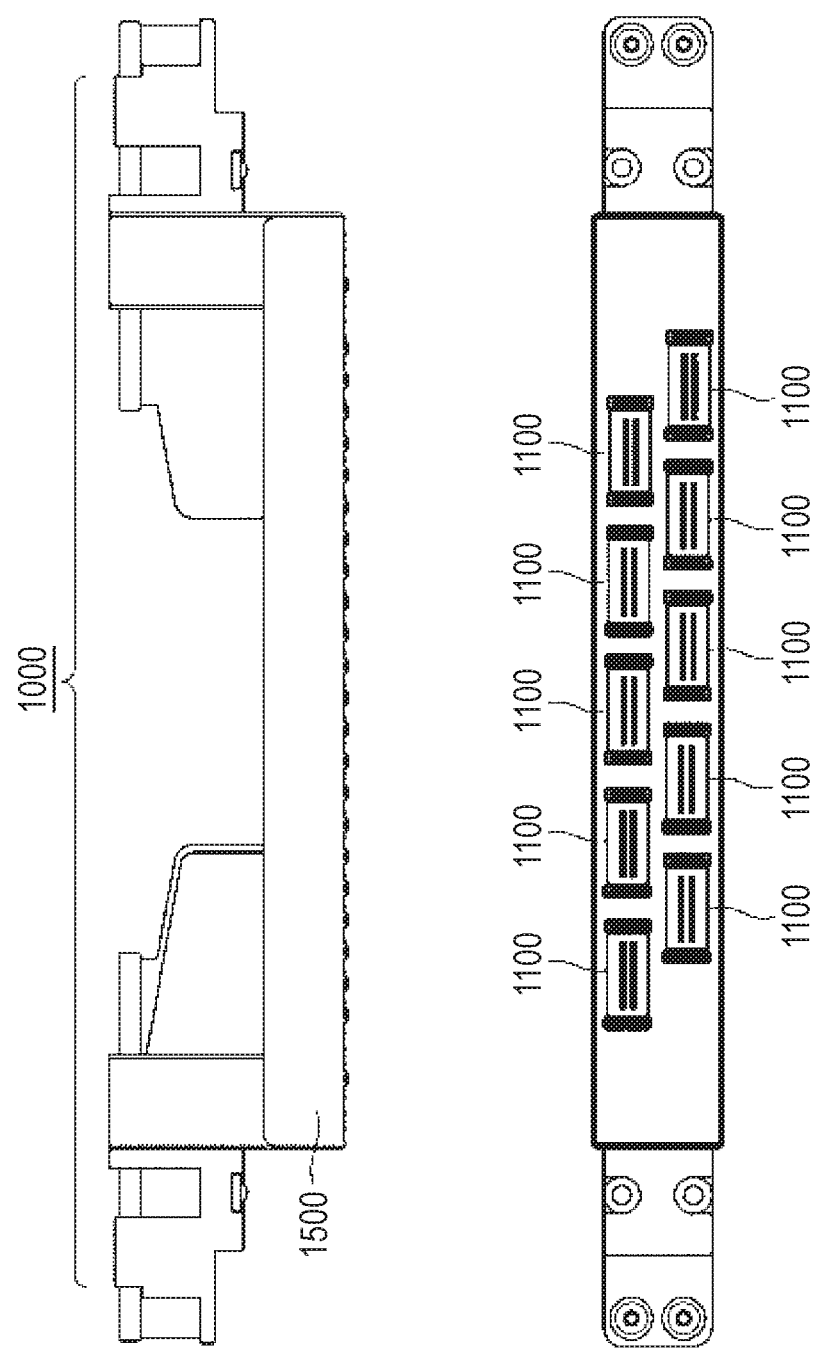

INK JET RECORDING HEAD AND METHOD OF MANUFACTURING SAME

BACKGROUND OF THE INVENTION

Field of the Invention

The present invention relates to an ink jet recording head using an epoxy resin molded product and a method of manufacturing the recording head.

Description of the Related Art

As an energy generation element that generates energy for ejecting an ink from an ejection orifice of a recording head of an ink jet recording apparatus, an electro-mechanical converter such as piezoelectric element is used. In addition, known are an element that generates heat by irradiation of an electromagnetic wave such as laser and makes use of the action caused by this heat generation for ejection of ink droplets and an electrothermal transducing element having a heat resistive member for heating a liquid.

Of such elements, recording heads having a system of ejecting ink droplets by making use of thermal energy (ink jet system) can carry out high-resolution recording because they can be provided with ejection orifices with high density. Of these, recording heads using an electrothermal transducing element as an energy generation element can be provided as compact ones. Moreover, the recording heads using an electrothermal transducing element are advantageous from the standpoint that they permit high density loading and can be manufactured at a low cost by making full use of the merits of IC technology and micromachining technology showing marked technological progress and reliability improvement in the recent semiconductor fields.

To carry out higher-definition recording, a method of manufacturing an ink ejection nozzle with high precision by means of photolithography or the like has also been utilized. In recent years, to achieve higher-speed recording of a higher-definition image, there is also a demand for the materialization of a recording head having a longer recording width. More specifically, there has been a demand for a recording head having a length of from 4 inches to 12 inches.

For materializing a recording head having such a long recording width, there is proposed, in Japanese Patent Application Laid-Open No. H05-24192, a recording head having a constitution for materializing a recording head with a long recording width as a whole by placing, on a base plate, a plurality of recording element substrates having an adequate number of nozzles and thereby having an adequate length. In this case, as a base plate member on which an ejection pressure generating element is mounted and to which a flow path and the like are added, that having high planarity and a linear expansion coefficient small enough to prevent occurrence of a stress with an Si substrate is required. In addition, the base plate member is required to have high ink resistance, because an impurity and the like eluted in an ink have a harmful effect on the ejection performance and much worse, a precipitate is formed to clog a nozzle therewith.

Examples of a typical material having such properties include alumina.

SUMMARY OF THE INVENTION

One aspect of the invention relates to an ink jet recording head having a flow path member. In this ink jet recording head, the flow path member is made of a thermoset product of a thermosetting molding composition containing a solid epoxy resin composition containing an epoxy resin which is solid at ordinary temperatures and a phenolic resin which is solid at ordinary temperatures and an alumina filler.

Another aspect of the invention relates to a method of manufacturing an ink jet recording head including forming a flow path member by injection molding a thermosetting molding material containing a solid epoxy resin composition containing an epoxy resin which is solid at ordinary temperatures and a phenolic resin which is solid at ordinary temperatures and an alumina filler.

Further features of the present invention will become apparent from the following description of exemplary embodiments with reference to the attached drawings.

BRIEF DESCRIPTION OF THE DRAWINGS

FIG. 1A is a side view and a bottom view showing one example of an ink jet recording head.

DESCRIPTION OF THE EMBODIMENTS

Molding of a large-scaled product using an alumina tends to require a very high cost.

When a base plate member was manufactured at a low cost by using a resin molding material described in Japanese Patent Application Laid-Open No. 2011-173970 or Japanese Patent Application Laid-Open No. 2009-155370 instead of using alumina, an ink jet recording head thus obtained was not always satisfactory from the standpoint of linear expansion or elution.

As the material, an epoxy resin was selected in consideration of chemical resistance and a liquid composition permitting incorporation of a large amount of a filler therein was used, but the amount of the filler should be increased to achieve a linear expansion coefficient as small as that of alumina. Then, the material became fine granules or powders, which prevented uniform mixing of the epoxy resin and the filler. Even a material obtained by reducing the amount of the filler and mixing them uniformly while preventing the resulting mixture from taking a powder state however causes expansion of a resin content and a decrease in resin viscosity at the time of heat extrusion when transfer molding suited for a liquid resin is performed. As a result, surface roughening due to separation between the resin and the filler occurred and surface accuracy could not be maintained.

Japanese Patent Application Laid-Open No. 2015-206009 describes use of a liquid resin as a molding material with a view to overcoming the above-described problem. An ink jet head is required to satisfy further long-term reliability and improved productivity for industrial uses. When it is immersed in an ink under severe conditions such as long-term ink storage, pressure cooker tester (PCT), or the like, a thin film on the filler peels to expose the filler and as a result, elution of the filler or, more worse, falling of the filler occurs. An object of the invention is therefore to provide an ink jet recording head using, as a flow path member, a material capable of satisfying both long-term ink resistance and a small linear expansion coefficient.

Embodiments of the ink jet recording head and the method of manufacturing the same according to the invention will hereinafter be described referring to drawings.

<Ink Jet Recording Head>

Figure 1B:
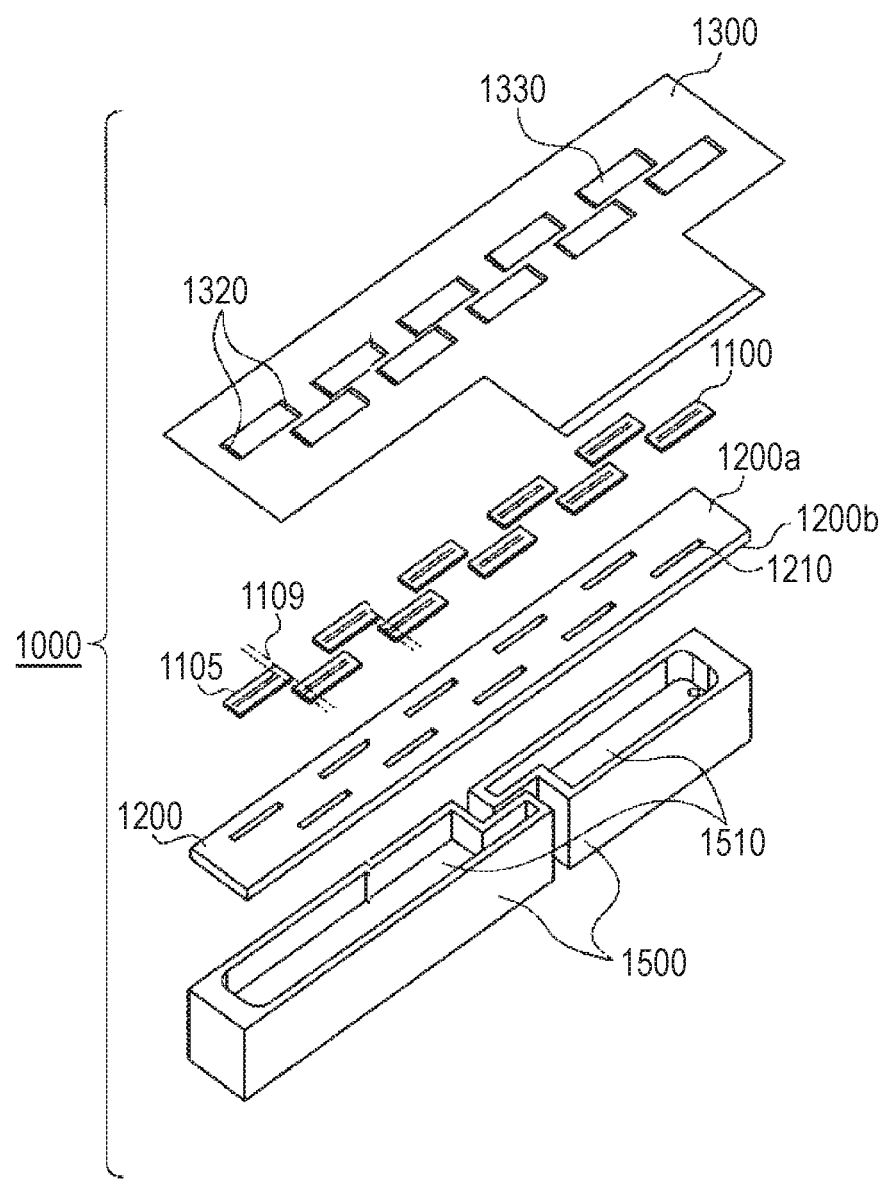
FIG. 1B is an exploded perspective view showing the one example of an ink jet recording head.

FIG. 1A is a side view and a bottom view showing one example of an ink jet recording head 1000 to which the invention can be applied. FIG. 1B is an exploded perspective view showing the constitution of parts of the ink jet recording head 1000 shown in FIG. 1A.

The ink jet recording head 1000 has thereon a row of nozzles arranged so as to cover the estimated maximum width of a sheet to be used. This recording head is an ink jet system full-line recording head capable of wide recording without scanning the ink jet recording head.

The ink jet recording head 1000 has a plurality of recording element substrates 1100 made of Si, a liquid supply slit 1210 and a base plate 1200 for supporting the recording element substrates. The ink jet recording head 1000 further has an electric wiring substrate 1300 for electrically connecting the recording element substrates and a recording apparatus, a liquid reservoir 1510 and an ink supply member 1500 to be joined to the base plate 1200. The recording element substrates 1100 each have an ejection orifice 1105 and are arranged on a main surface 1200a of the base plate 1200 with precision in a direction (Y direction) crossing a recording medium conveying direction (X direction). In FIG. 1B, two rows of the recording element substrates 1100 are arranged alternately so that the respective end portions 1109 of two adjacent ejection orifices overlap with each other. The base plate has, on a surface 1200b opposite to the main surface 1200a thereof, an ink supply member 1500. The electric wiring substrate 1300 is equipped with an electrode terminal 1320 and an opening 1330.

The base plate 1200 constitutes a part of the flow path so that it should have high resistance against a liquid such as ink. For example, when even several ppm of the material of the base plate is eluted in a liquid such as ink, the liquid such as ink evaporates near the ejection orifice and precipitates adheres to the vicinity of the ejection orifice. This may cause misdirection of ejected liquid droplets, leading to defective printing. The base plate 1200 is bonded to the recording element substrates 1100 made of Si with an adhesive or the like and it is required to have high dimensional accuracy so that the linear expansion coefficient of the base plate 1200 is preferably as small as possible.

In the invention, therefore, the flow path member such as the base plate 1200 is made of a thermoset product obtained using a thermosetting molding material containing a solid epoxy resin composition containing an epoxy resin which is solid at ordinary temperatures and a phenolic resin which is solid at ordinary temperatures and an alumina filler.

The material used in the invention has a small linear expansion coefficient, has excellent molding properties, causes less elution in a liquid such as ink, and is capable of being used in injection molding.

In the invention, since a molding material can be provided in granular form by using a solid resin component, a filler can be filled with high density. In particular, when an injection molding machine is used, a resin composition using a solid epoxy resin and a solid phenolic resin in combination has a relatively low melt viscosity and has high wettability with alumina so that the surface of the filler can be fitted well to the resin by the screw in the injection molding machine. In particular, using a polyfunctional resin as the solid epoxy resin and the solid phenolic resin increases a crosslink density and achieves stronger adhesion of the filler so that falling of the filler does not occur easily. In addition, using alumina as the filler makes it difficult to cause elution from the filler even if a thin skin of the resin partially peels. Further, using a solid epoxy resin and a solid phenolic resin reduces a melt viscosity and even an increase in the filler content does not hinder the good fluidity at the time of molding.

The thermosetting molding material to be used for molding the thermoset product of the invention and its components will hereinafter be described.

The solid epoxy resin composition contains an epoxy resin which is solid at ordinary temperatures (which may hereinafter be called "solid epoxy resin"), a phenolic resin which is solid at ordinary temperatures and serves as a curing agent (which may hereinafter be called "phenolic curing agent"), a curing accelerator, a silane agent and the like. The solid epoxy resin and the phenolic curing agent which are main agents should be solid, but another additive may be either a liquid or a solid. An epoxy resin to be added in general as needed for the purpose of property modification may also be either a liquid or a solid. The solid epoxy resin composition is not limited insofar as it is solid at ordinary temperatures. It preferably has a melting temperature of 50° C. or more from the standpoint of storage stability and handling.

The solid epoxy resin is preferably a resin in solid form at ordinary temperatures (from 15 to 35° C.) and having a melting temperature falling within a range of from 50 to 120° C. Examples of the solid epoxy resin include naphthalene skeleton, cresol novolac, triphenyl, biphenyl, dicyclopentadiene, naphthol skeleton, bisphenol novolac, glycidyl amine, phenol biphenylene, and alicyclic epoxy resins. These epoxy resins may be used either singly or in combination.

Of these solid epoxy resins, polyfunctional epoxy resins can be used preferably from the standpoint of ink resistance, adhesion to the filler, and molding tact. Among them, a triphenyl epoxy resin is most suited as the flow path member because by using it in combination with the phenolic curing agent, a molded product having a high glass transition temperature and moreover, having excellent ink resistance can be obtained.

The solid phenolic resin used as a curing agent is preferably solid at ordinary temperatures (from 15 to 35° C.) and has a melting temperature falling within a range of from 50 to 120° C. Examples of the solid phenolic resin include phenol novolac, xylylene novolac, bis A novolac, triphenylmethane novolac, biphenyl novolac, and dicyclopentadiene phenolic resins. These phenolic resins may be used either singly or in combination.

Of these solid phenolic resins, polyfunctional epoxy resins can be used preferably from the standpoint of ink resistance, adhesion to the filler, and molding tact. Using the phenolic resin as the curing agent improves wettability of the solid epoxy resin composition with the alumina filler to achieve strong adhesion between the epoxy resin composition and the alumina filler. This enables reliable long-term storage of an ink.

In the thermosetting molding material of the invention, an epoxy amount should be increased because remaining of a phenolic hydroxyl group in a molded product after a thermosetting reaction lowers ink resistance of the product. With respect to the respective contents of the solid epoxy resin and the solid phenolic resin, a (the epoxy group in the solid epoxy resin): (the phenolic hydroxyl group of the solid phenolic resin) molar ratio is preferably adjusted to fall within a range from 1.0:0.7 to 1.0:0.98, more preferably from 1.0:0.90 to 1.0:0.98.

The total content of the solid epoxy resin and the solid phenolic resin in the thermosetting molding material is preferably from 8 to 30 mass %, more preferably from 9 to 15 mass %.

The solid phenolic resin serving as a curing agent has generally low reactivity so that it is preferably used in combination with a curing accelerator. Addition of the curing accelerator can also accelerate the reaction of an epoxy group that has not yet reacted with the phenolic hydroxyl group. The molded product therefore has no unreacted component therein and it has good ink resistance. Examples of such a curing accelerator include imidazoles such as 2-ethyl-4-methylimidazole and 1-(2-cyanoethyl)-2-ethyl-4-methylimidazole imidazole, tertiary amines, and triphenylphosphines.

The content of the curing accelerator in the thermosetting molding material is preferably from 0.01 to 0.5 mass %, more preferably from 0.1 to 0.3 mass %.

In the invention, an alumina filler is used because of reduced elution in an ink and a small linear expansion coefficient. In order to suppress linear expansion and achieve high-density filling, the alumina filler is preferably spherical. For full-density filling, fillers different in particle size are preferably used in combination. To achieve full-density filling, an alumina filler having a larger average particle size preferably has a particle size from three to five times that of an alumina filler having a smaller average particle size. The alumina filler having a larger average particle size has preferably a particle size of from 15 to 50 while the alumina filler having a smaller average particle size has preferably a particle size of from 3 to 15 μm. A (larger-average-particle size alumina filler):(smaller-average-particle size alumina filler) weight ratio is preferably from 9:1 to 6:4. The average particle size of the total alumina filler is 50 μm or less. Average particle sizes larger than it may deteriorate the filling property at the details or deteriorate the fluidity at the time of molding. On the other hand, average particle sizes not greater than 5 μm may increase a specific surface area and improves curing characteristics, but deteriorate the fluidity at the time of molding. Therefore, the average particle size of the total alumina filler is particularly preferably from 10 to 30 The term "average particle size" as used herein means a number-average particle size. A filling amount of the alumina filler in the thermoset product is desirably as large as possible in consideration of the ink resistance, linear expansion coefficient, and thermal conductivity, but is preferably from 70 to 92 mass %, more preferably from 85 to 91 mass % in consideration of the molding property.

The alumina filler treated with a silane coupling agent is preferred to improve adhesion of it to the resin component. In this case, a using amount of the silane coupling agent is preferably from 0.01 to 0.06 part by mass, more preferably from 0.02 to 0.04 part by mass, based on 100 parts by mass of the alumina filler. Examples of the silane coupling agent include γ-glycidoxypropyl trimethoxysilane, β-(3,4-epoxycyclohexyl)ethyltrimethoxysilane, γ-mercaptopropyltriethoxysilane and γ-aminopropyltrimethoxysilane. Alternatively, a titanate-based or aluminate-based coupling agent may be used. These silane coupling agents may be used either singly or in combination.

EXAMPLES

The molding material of the invention will hereinafter be described by Examples and Comparative Examples. All designations of "part" or "parts" indicate part or parts by mass unless otherwise specifically indicated.

<Manufacture of Molding Material>

Molding materials 1 to 11 shown in Tables 1 and 2 were prepared. More specifically, the solid epoxy resin, the solid phenolic resin serving as a curing agent, the curing accelerator (curing catalyst) and the fluidity improver listed in Tables 1 and 2 were mixed according to the respective amounts described in Tables 1 and 2. Then, the resulting mixture was stirred while adding a filling material thereto in small portions. Mixing of the materials was performed using a mixer. Heat melting and mixing treatment was performed using a heated roll and a kneader, followed by cooling and solidification, grinding and filtering to equalize the particle size to obtain a molding material. The molding material thus obtained was evaluated as described below. The results are shown in both Table 1 and Table 2.

The treatment of the alumina filler used as a filler with the silane coupling agent was performed in the following manner.

An alumina filler (10 kg) was poured in a Henschel mixer and while stirring at 700 rpm, a solution composed of 3 g of a silane coupling agent ("A-187", trade name; product of Momentive Performance Materials) and 400 g of ethanol was poured. The resulting mixture was stirred for 5 minutes. After confirmation that the whole mixture became a uniform tacky solution, steam was charged. After the steam evaporated the solvent, the rotational speed of stirring was increased to 1400 rpm and the residue was kept for 5 minutes at 100° C. and then, cooled. Thus, the alumina filler was treated with the silane coupling agent.

<Evaluation of Injection Molding Property>

Figure 2:
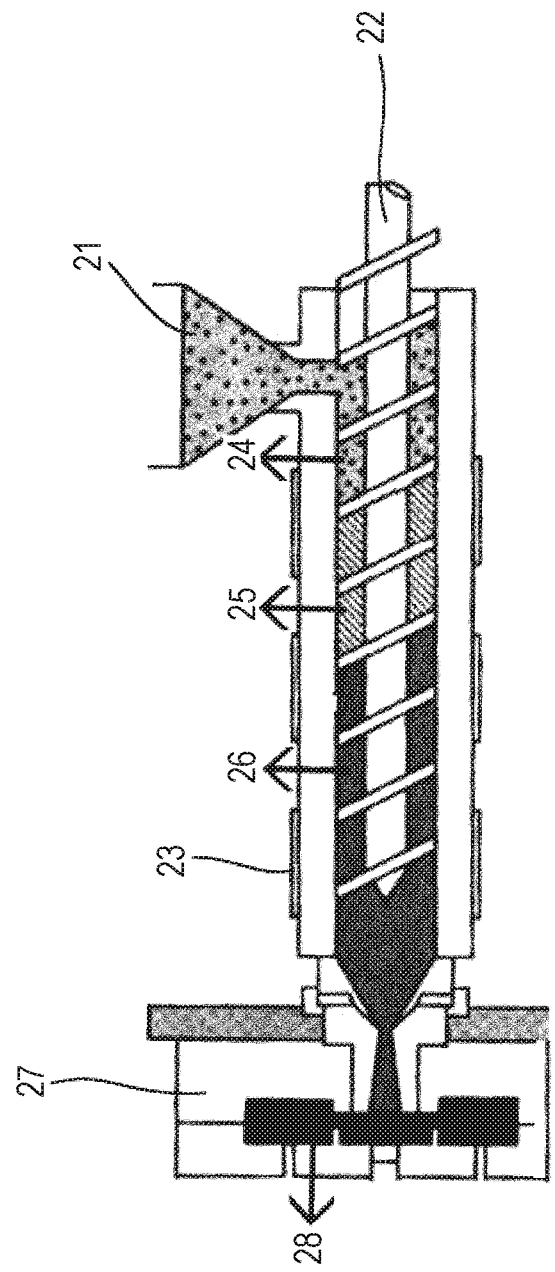
FIG. 2 is a schematic view showing an injection molding machine used in examples.

The molding materials thus obtained were each evaluated for their injection molding property at the time of injection molding using an injection molding machine shown in FIG. 2.

Each of the molding materials is poured from a hopper 21. The material thus poured is pushed toward a mold 27 by a screw 22. While it is pushed and heated with a heater 23, it changes from a solid 24 to a sticky state 25 and then to a liquid state 26. It is pushed into a high-temperature mold 27 and is gradually cured into a molded product 28.

It is observed whether or not the molding materials can be injection molded as usual in the above-described injection molding step and are evaluated for their injection molding property. The results are shown in Tables 1 and 2. The property after kneading shown in the tables is checked by visual observation and finger touch.

The conditions of the injection molding machine are set as follows. An injection molding machine ("EC75SXR", trade name; product of Toshiba Machine) is used and a 40 mm×40 mm×3 mm flat plate is molded under the condition of 175° C. for 2 minutes.

<Evaluation of Ink Resistance>

After the molded products obtained in the above-described evaluation of injection molding property was subjected to additional thermosetting at 180° C. for 8 hours, their ink resistance was tested as described below. Resin compositions 9 to 11 of Comparative Examples could not be injection molded so that compression molding was performed and the products thus obtained was evaluated. Although the ink resistance can be evaluated using molded products immediately after molding, additional heating is performed in consideration of their long-term ink resistance, because there is a possibility that a relatively low curing reactivity of the phenolic curing agent may retard completion of the reaction of the components of the molded product.

The molded products thus obtained were immersed in a transparent distribution ink (distribution ink for ink jet printer) ("F850", trade name; product of Canon) and heated at 121° C. for 10 hours in PCT. After air cooling to ordinary temperatures, the elution of the filler (inorganic matter) into the ink from the molded products was checked using an ICP emission spectrometer and at the same time, presence of falling of the filler from the molded products was observed. The molded products from which neither elution nor falling was observed were heated as were again at 121° C. for 250 hours in PCT and elution of the filler and falling of the filler were observed similarly. The results are shown in Tables 1 and 2.

TABLE 1

| Classification of material | Material name | Trade name | Melting temperature | Molding material 1 | Molding material 2 |
|---|---|---|---|---|---|
| Epoxy resin | Naphthalene skeleton | NC-7300L (product of Nippon Kayaku) | 74 | 100 | |
| | Cresol novolac | EOCN-1020 (product of Nippon Kayaku) | 62 | | 100 |
| | Triphenyl polyfunctional | EPPN-502H (product of Nippon Kayaku) | 67 | | |
| | Biphenyl skeleton | NC-300 (product of Nippon Kayaku) | 56 | | |
| | Bis A-type epoxy | 828EL (product of Mitsubishi Chemical) | Liquid | | |
| Curing agent | Phenol novolac | BRG-557 (product of Aica SDK Phenol) | 86 | 43 | 48 |
| | Polyfunctional phenolic | MEH-7500 (product of Meiwa Plastic Industries) | 110 | | |
| | Polyfunctional biphenylenearalkyl skeleton | HE-200C-10 (product of Air Water) | 70 | | |
| | Allylated phenol novolac | MEH-8000H (product of Meiwa Plastic Industries) | Liquid | | |
| Curing accelerator/curing catalyst | TPP | Triphenylsulfone | 80 | 2 | 2 |
| | Imidazole | C17Z (product of Shikoku Chemicals) | 90 | | |
| Filler | Alumina 20 μm | DMA-20 (product of Denka) | | 900 | 930 |
| | Alumina 5 μm | DMA-05A (product of Denka) | | 386 | 400 |
| | Alumina 20 μm, treated with silane | DMA-20 (product of Denka) | (*treated with silane) | | |
| | Alumina 5 μm, treated with silane | DMA-05A (product of Denka) | (*treated with silane) | | |
| | Molten silica 24 μm | FB-950 (product of Denka) | | | |
| | Molten silica 5 μm | FB-5D (product of Denka) | | | |
| Fluidity improver | Carnauba wax | Carnauba wax (product of Cerarica NODA) | | 2 | 2 |
| Evaluation | | Injection molding | Property after kneading | Granules possible | Granules possible |
| | | | Injection molding property | | |
| | | Ink resistance 121° C. 10 hr | Elution of inorganic matter | Absent | Absent |
| | | | Falling of filler | Absent | Absent |
| | | 121° C. 250 hr | Elution of inorganic matter | Absent | Absent |
| | | | Falling of filler | Slight | Slight |

| Classification of material | Material name | Trade name | Molding material 3 | Molding material 4 | Molding material 5 | Molding material 6 | Molding material 7 |
|---|---|---|---|---|---|---|---|
| Epoxy resin | Naphthalene skeleton | NC-7300L (product of Nippon Kayaku) | | | | | |
| | Cresol novolac | EOCN-1020 (product of Nippon Kayaku) | | | | | |
| | Triphenyl polyfunctional | EPPN-502H (product of Nippon Kayaku) | 100 | 100 | 100 | 100 | |
| | Biphenyl skeleton | NC-300 (product of Nippon Kayaku) | | | | | 100 |
| | Bis A-type epoxy | 828EL (product of Mitsubishi Chemical) | | | | | |
| Curing agent | Phenol novolac | BRG-557 (product of Aica SDK Phenol) | 55 | 55 | | | 33 |
| | Polyfunctional phenolic | MEH-7500 (product of Meiwa Plastic Industries) | | | 55 | | |
| | Polyfunctional biphenylenearalkyl skeleton | HE-200C-10 (product of Air Water) | | | | 110 | |
| | Allylated phenol novolac | MEH-8000H (product of Meiwa Plastic Industries) | | | | | |
| Curing accelerator/curing catalyst | TPP | Triphenylsulfone | 2 | 2 | | 2 | 2 |
| | Imidazole | C17Z (product of Shikoku Chemicals) | | | 2 | | |
| Filler | Alumina 20 μm | DMA-20 (product of Denka) | 976 | | 976 | 1320 | 838 |
| | Alumina 5 μm | DMA-05A (product of Denka) | 416 | | 416 | 570 | 359 |
| | Alumina 20 μm, treated with silane | DMA-20 (product of Denka) | | 976 | | | |
| | Alumina 5 μm, treated with silane | DMA-05A (product of Denka) | | 416 | | | |
| | Molten silica 24 μm | FB-950 (product of Denka) | | | | | |
| | Molten silica 5 μm | FB-5D (product of Denka) | | | | | |

TABLE 1-continued

| | | | | | | | | |
|---|---|---|---|---|---|---|---|---|
| Fluidity improver | Carnauba wax | Carnauba wax (product of Cerarica NODA) | 2 | 2 | 2 | 2 | 2 |
| Evaluation | | Injection molding | Granules possible | Granules possible | Granules possible | Granules possible | Granules possible |
| | Ink resistance | 121° C. 10 hr | Absent Absent | Absent Absent | Absent Absent | Absent Absent | Absent Absent |
| | | 121° C. 250 hr | Absent Very slight | Absent Absent | Absent Slight | Absent Slight | Absent Slight |

TABLE 2

| Classification of material | Material name | Trade name | Melting temperature | Comparative Example (part by mass) Molding material 8 |
|---|---|---|---|---|
| Epoxy resin | Naphthalene skeleton | NC-7300L (product of Nippon Kayaku) | 74 | |
| | Cresol novolac | EOCN-1020 (product of Nippon Kayaku) | 62 | |
| | Triphenyl polyfunctional | EPPN-502H (product of Nippon Kayaku) | 67 | 100 |
| | Biphenyl skeleton | NC-300 (product of Nippon Kayaku) | 56 | |
| | Bis A-type epoxy | 828EL (product of Mitsubishi Chemical) | Liquid | |
| Curing agent | Phenol novolac | BRG-557 (product of Aica SDK Phenol) | 86 | 55 |
| | Polyfunctional phenolic | MEH-7500 (product of Meiwa Plastic Industries) | 110 | |
| | Polyfunctional biphenylenearalkyl skeleton | HE-200C-10 (product of Air Water) | 70 | |
| | Allylated phenol novolac | MEH-8000H (product of Meiwa Plastic Industries) | Liquid | |
| Curing accelerator/curing catalyst | TPP | Triphenylsulfone | 80 | 2 |
| | Imidazole | C17Z (product of Shikoku Chemicals) | 90 | |
| Filler | Alumina 20 μm | DMA-20 (product of Denka) | | |
| | Alumina 5 μm | DMA-05A (product of Denka) | | |
| | Alumina 20 μm, treated with silane | DMA-20 (product of Denka) | (*treated with silane) | |
| | Alumina 5 μm, treated with silane | DMA-05A (product of Denka) | (*treated with silane) | |
| | Molten silica 24 μm | FB-950 (product of Denka) | | 976 |
| | Molten silica 5 μm | FB-5D (product of Denka) | | 416 |
| Fluidity improver | Carnauba wax | Carnauba wax (product of Cerarica NODA) | | 2 |
| Evaluation | | Injection molding | Property after kneading | Granules |
| | | | Injection molding property | possible |
| | Ink resistance | 121° C. 10 hr | Elution of inorganic matter | Present |
| | | | Falling of filler | Absent |
| | | 121° C. 250 hr | Elution of inorganic matter | — |
| | | | Falling of filler | — |

| | | | Comparative Example (part by mass) | | |
|---|---|---|---|---|---|
| Classification of material | Material name | Trade name | Molding material 9 | Molding material 10 | Molding material 11 |
| Epoxy resin | Naphthalene skeleton | NC-7300L (product of Nippon Kayaku) | | 100 | 100 |
| | Cresol novolac | EOCN-1020 (product of Nippon Kayaku) | | | |
| | Triphenyl polyfunctional | EPPN-502H (product of Nippon Kayaku) | | | |
| | Biphenyl skeleton | NC-300 (product of Nippon Kayaku) | | | |
| | Bis A-type epoxy | 828EL (product of Mitsubishi Chemical) | 100 | 100 | |
| Curing agent | Phenol novolac | BRG-557 (product of Aica SDK Phenol) | 50 | | |
| | Polyfunctional phenolic | MEH-7500 (product of Meiwa Plastic Industries) | | | |

TABLE 2-continued

|  |  |  |  |  |  |
|---|---|---|---|---|---|
|  | Polyfunctional biphenylenearalkyl skeleton | HE-200C-10 (product of Air Water) |  |  |  |
|  | Allylated phenol novolac | MEH-8000H (product of Meiwa Plastic Industries) |  | 53 | 100 |
| Curing accelerator/curing catalyst | TPP | Triphenylsulfone | 2 | 2 | 2 |
|  | Imidazole | C17Z (product of Shikoku Chemicals) |  |  |  |
| Filler | Alumina 20 μm | DMA-20 (product of Denka) | 945 | 960 | 1260 |
|  | Alumina 5 μm | DMA-05A (product of Denka) | 405 | 410 | 540 |
|  | Alumina 20 μm, treated with silane | DMA-20 (product of Denka) |  |  |  |
|  | Alumina 5 μm, treated with silane | DMA-05A (product of Denka) |  |  |  |
|  | Molten silica 24 μm | FB-950 (product of Denka) |  |  |  |
|  | Molten silica 5 μm | FB-5D (product of Denka) |  |  |  |
| Fluidity improver | Carnauba wax | Carnauba wax (product of Cerarica NODA) | 2 | 2 | 2 |
| Evaluation |  | Injection molding | Sticky granules impossible | Sticky granules (including mass) impossible | Sticky granules impossible |
|  | Ink resistance | 121° C. 10 hr | Absent Present | Absent Present | Absent Present |
|  |  | 121° C. 250 hr | — — | — — | — — |

Molded products were obtained from the molding materials 1 to 7 of Examples and the molding material 8 of Comparative Example normally by injection molding.

On the other hand, the molding materials 9 to 11 of Comparative Examples were sticky so that when they were poured in the injection molding machine, they clogged a hopper 21 therewith and prevented molding under a normal condition.

The molding materials 1 to 7 of Examples use a polyfunctional material and a solid material so that they have good ink resistance without elution and falling of the filler for 10 hours at 121° C. The molding materials 3 and 4 of Examples use a polyfunctional epoxy resin with a triphenyl skeleton as the epoxy resin and they have Tg of 185° C. which is higher by from 20 to 40° C. than that of the other molding materials. The molding materials 3 and 4 of Examples have good ink resistance because the curing temperature of the materials added during manufacture is at most 180° C. so that no stress due to a difference in linear expansion is applied during manufacture and a crosslink density is high. Further, the results of injection molding at 121° C. for 250 hours show that the molding materials 3 and 4 cause less falling of the filler than another resin composition. In particular, the molding material 4 using an alumina filler subjected to silane coupling treatment and therefore having improved adhesion to the resin component has particularly excellent ink resistance without causing falling of filler.

In the present Examples, the alumina filler content is as large as 90 mass % and thermal conductivity is about 5 W/mK. It is necessary to release heat from the recording element substrate that generates heat during printing and particularly, an ink jet head for industrial is equipped with many recording element substrates. This suggests that the resin compositions of the present Examples have effective characteristics.

The molding material 8 of Comparative Example does not contain an alumina filler but is filled with much molten quartz as a filler so that elution of a slight amount of silica exposed from the surface inevitably occurs. A large elution amount may cause reprecipitation or reaction with an ink component, forms a solid and becomes a cause of misdirection of ejection or misfiring.

From the molding materials 9 to 11 of Comparative Examples, the filler inevitably falls because of insufficient adhesion to alumina. The filler that has fallen is conveyed together with the ink, remains in the ink flow path and increases the flow resistance. Even worse, it clogs an ejection orifice and causes misfiring.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-030889, filed Feb. 23, 2018, and Japanese Patent Application No. 2018-247640, filed Dec. 28, 2018, which are hereby incorporated by reference herein in their entirety.

What is claimed is:

1. An ink jet recording head having a flow path member made of a thermoset product of a thermosetting molding material comprising a solid epoxy resin composition containing an epoxy resin which is solid at ordinary temperatures and a phenolic resin which is solid at ordinary temperatures and an alumina filler,
    wherein the epoxy resin and the phenolic resin are each a polyfunctional resin, and
    wherein a molar ratio of an epoxy group of the epoxy resin to a phenolic hydroxyl group of the phenolic resin is from 1.0:0.7 to 1.0:0.98.

2. An ink jet recording head having a flow path member made of a thermoset product of a thermosetting molding material comprising a solid epoxy resin composition containing an epoxy resin which is solid at ordinary temperatures and a phenolic resin which is solid at ordinary temperatures and an alumina filler,
    wherein the epoxy resin and the phenolic resin each have a melting temperature of 50° C. or more, and
    wherein a molar ratio of an epoxy group of the epoxy resin to a phenolic hydroxyl group of the phenolic resin is from 1.0:0.7 to 1.0:0.98.

3. The ink jet recording head according to claim 1, wherein the alumina filler is treated with a silane coupling agent.

4. The ink jet recording head according to claim 1, wherein the flow path member is a base plate for supporting a recording element substrate.

5. The ink jet recording head according to claim 1, wherein the epoxy resin is a triphenyl type epoxy resin.

6. The ink jet recording head according to claim 1, wherein a content of the alumina filler in the thermoset product is from 70 to 92 mass %.

7. The ink jet recording head according to claim 1, wherein a content of the alumina filler in the thermoset product is from 85 to 91 mass %.

8. A method of manufacturing an ink jet recording head having a flow path member, the method comprising forming the flow path member by injection molding a thermosetting molding material containing a solid epoxy resin composition containing an epoxy resin which is solid at ordinary temperatures and a phenolic resin which is solid at ordinary temperatures and an alumina filler.

9. The ink jet recording head according to claim 2, wherein the alumina filler is treated with a silane coupling agent.

10. The ink jet recording head according to claim 2, wherein the flow path member is a base plate for supporting a recording element substrate.

11. The ink jet recording head according to claim 2, wherein the epoxy resin is a triphenyl type epoxy resin.

12. The ink jet recording head according to claim 2, wherein a content of the alumina filler in the thermoset product is from 70 to 92 mass %.

13. The ink jet recording head according to claim 2, wherein a content of the alumina filler in the thermoset product is from 85 to 91 mass %.

14. The method of manufacturing the ink jet recording head according to claim 8, wherein the epoxy resin and the phenolic resin are each a polyfunctional resin.

15. The method of manufacturing the ink jet recording head according to claim 8, wherein the epoxy resin and the phenolic resin each have a melting temperature of 50° C. or more.

16. The method of manufacturing the ink jet recording head according to claim 8, wherein the alumina filler is treated with a silane coupling agent.

17. The method of manufacturing the ink jet recording head according to claim 8, wherein the flow path member is a base plate for supporting a recording element substrate.

18. The method of manufacturing the ink jet recording head according to claim 8, wherein the epoxy resin is a triphenyl type epoxy resin.

* * * * *